United States Patent

Lengyel et al.

Patent Number: 6,069,441
Date of Patent: May 30, 2000

[54] METHOD FOR PRODUCING PHOSPHER BINDING MATERIALS

[75] Inventors: J. Michael Lengyel, Ramona, Calif.; Ronald C. Robinder, Albuquerque, N.Mex.

[73] Assignee: Honeywell Inc., Minneapolis, Minn.

[21] Appl. No.: 08/979,373

[22] Filed: Nov. 26, 1997

Related U.S. Application Data

[62] Division of application No. 08/740,619, Oct. 31, 1996, Pat. No. 5,731,658.

[51] Int. Cl.⁷ .................................................. H01J 1/62
[52] U.S. Cl. ............................ 313/489; 313/485; 313/486
[58] Field of Search .................................. 313/485, 486, 313/487, 488, 489; 445/57; 427/67, 73, 64, 157; 252/588, 589, 301.36

[56] References Cited

U.S. PATENT DOCUMENTS

| | | | |
|---|---|---|---|
| Re. 33,987 | 7/1992 | Suzawa ...................................... | 359/49 |
| 3,157,362 | 11/1964 | Waly . | |
| 3,205,394 | 9/1965 | Ray . | |
| 3,525,864 | 8/1970 | Leach . | |
| 3,586,471 | 6/1971 | McDonough et al. . | |
| 3,725,710 | 4/1973 | De Gier et al. .......................... | 313/64 |
| 4,344,016 | 8/1982 | Hoffmann et al. ...................... | 313/489 |
| 4,382,207 | 5/1983 | Verstegen et al. ...................... | 313/486 |
| 4,421,803 | 12/1983 | Czeiler et al. . | |
| 4,540,915 | 9/1985 | Shinkai et al. .......................... | 313/486 |
| 4,551,397 | 11/1985 | Yaguchi et al. .......................... | 428/691 |
| 4,559,470 | 12/1985 | Murakami et al. ...................... | 313/487 |
| 4,744,012 | 5/1988 | Bergkvist .................................. | 362/84 |
| 4,771,214 | 9/1988 | Takenaka et al. ....................... | 313/479 |
| 4,803,400 | 2/1989 | Peters et al. . | |
| 4,857,798 | 8/1989 | Ford ........................................ | 313/487 |
| 4,890,033 | 12/1989 | Ichinomiya et al. .................... | 313/487 |
| 4,916,359 | 4/1990 | Jönsson .................................. | 313/489 |
| 4,940,918 | 7/1990 | Rutfield .................................. | 313/487 |
| 4,945,282 | 7/1990 | Kawamura et al. .................... | 313/479 |
| 4,987,338 | 1/1991 | Itou et al. .............................. | 313/478 |
| 5,051,653 | 9/1991 | DeBoer et al. .......................... | 313/489 |
| 5,128,783 | 7/1992 | Abileah et al. .......................... | 359/49 |
| 5,186,743 | 2/1993 | Flasch .................................. | 106/38.35 |
| 5,200,233 | 4/1993 | Mohacsi .................................. | 427/67 |
| 5,220,249 | 6/1993 | Tsukada ................................ | 315/246 |
| 5,310,504 | 5/1994 | Ihm et al. .......................... | 252/301.36 |
| 5,502,626 | 3/1996 | Armstrong et al. ..................... | 362/216 |
| 5,579,134 | 11/1996 | Lengyel .................................. | 359/49 |
| 5,677,071 | 10/1997 | Kang .................................. | 428/690 |
| 5,723,070 | 3/1998 | Kim et al. .......................... | 252/301.36 |

FOREIGN PATENT DOCUMENTS 1011922  12/1965  United Kingdom .

Primary Examiner—Nimeshkumar D. Patel
Assistant Examiner—Bidred J. Smith
Attorney, Agent, or Firm—Andrew A. Abeyta; Kenneth J. Johnson

[57] ABSTRACT

A phosphor binding material and process is shown and described for LCD backlight systems. The improved process provides a residual phosphor binding material transparent to UV light. No UV light energy is lost to absorption in the binding material and more UV light energy is used to produce visible light. Because the UV light is better utilized in the production of visible light, overall lamp efficiency is improved.

15 Claims, 2 Drawing Sheets

METHOD FOR PRODUCING PHOSPHER BINDING MATERIALS

This application is a divisional of application Ser. No. 08/740,619, filed on Oct. 31, 1996 now U.S. Pat. No. 5,731,658.

BACKGROUND OF THE INVENTION

The present invention relates generally to phosphor binders, and particularly to phosphor binders for use in a backlight for liquid crystal display (LCD) devices.

Obtaining the maximum light energy output for a given power input to a fluorescent lamp used as a backlight in an active matrix liquid crystal display (AMLCD) is an important operational feature in this type of display system. In particular, AMLCD devices transmit very little of the backlight provided. For a color AMLCD, only 2.5 to 4% of the backlight passes through the AMLCD. For monochrome applications, up to 12% of the backlight passes through the LCD. In either case, the most efficient use of backlight provided must be obtained to maximize the limited light passage capabilities of the AMLCD. The lumens (light out) per watt (light in) conversion in a LCD backlight system can be taken as a measure of efficiency for a fluorescent lamp backlight system. As may be appreciated, it is desirable to maximize the energy efficiency of a fluorescent lamp backlight system.

Light produced by a conventional fluorescent lamp is a result of excited phosphor exposed to ultraviolet (UV) light energy, e.g., generated from a mercury arc stream passing through a tube having phosphor bound on its inner surface. Fluorescent lamps, typically used in backlighting an LCD device, provide the best lumens per watt conversion efficiency relative to other practical light sources. Despite this highly efficient character of fluorescent lamps relative to other types of lighting devices, further improvement in the efficiency of LCD backlights is desired.

One aspect of efficient use of energy applied to a fluorescent lamp in an LCD backlight system requires use of as much of the UV light as possible in exciting the phosphor molecules to produce visible light.

Fluorescent coatings, in conventional fluorescent lamp manufacturing, result from a phosphor-binder slurry drawn into a glass tube, i.e., lamp envelope, then allowed to run out of the tube. The residual slurry material, i.e., that left on the interior walls of the glass tube, is refined through high temperature baking to remove binder material that would otherwise absorb UV light and cause a loss in light output, i.e., a loss in UV photons which could be otherwise used to excite the phosphor particles. The result of this phosphor coating process is a moderately uniform layer of phosphor on the inside of the tube. It is known in the industry that an ideal phosphor coating is on the order of 3 to 5 phosphor particles thick; the average phosphor particle size being in the micrometer ($10^{-6}$) range. Excitation efficiency drops for coatings thicker than the optimum thickness because phosphor particles are not fully excited by the ultraviolet photon bombardment and light output falls drastically. Likewise, phosphor coatings thinner than the optimum thickness do not use all the potential light producing ability of the ultraviolet photons generated by the mercury arc stream. Light output is then less than that possible for the amount of power provided to the lamp in producing the arc. As used herein, the terms "relatively thin" and "relatively thick" presented in reference to a phosphor coating shall refer to the thickness of the phosphor coating as being either thinner or thicker, respectively, than the optimum phosphor coating thickness.

The prevailing rule for manufacturing fluorescent lamps is that a relatively thin phosphor coating is preferred and more practical than relatively thick phosphor coatings. High volume manufacturing processes generally will not support an optimum phosphor coating thickness.

A portion of the binding material can remain in the phosphor coating and absorb available UV light energy. The energy of the UV light absorbed by the residual binding material represents a loss or inefficiency because it does not contribute to phosphor excitation in production of visible light. Conventional fluorescent lamp backlight technology has used a lacquer-type of binder that must be baked out of the phosphor coating. If not fully removed, this can result in residue on the surface of the phosphor contaminating the arc stream and causing a loss in efficiency and shorter lamp life. Generally, the problem of residual phosphor binding material has not been particularly significant in conventional fluorescent lamps. The phosphor coating in a standard tubular glass fluorescent lamp can be baked at relatively high temperatures, e.g., 400°–500° centigrade, to remove virtually all of the organic binder material. This relatively high temperature baking step leaves little or no residual binder material, and therefore provides a process for eliminating loss due to UV light absorption by residual phosphor binding material.

When a fluorescent lamp device cannot be taken to such relatively high temperatures, i.e., substantially less than 400°–500° centigrade, a significant portion of the phosphor binding material would remain and present opportunity for absorption of UV light. Unfortunately, LCD backlight devices are desirably constructed of materials other than high-temperature resistant materials, e.g., desirably constructed from plastic material. Accordingly, conventional manufacturing materials and processes for establishing a phosphor coating are not acceptable with respect to use in such LCD backlights.

Ultraviolet photons are easily absorbed by most materials considered suitable for use as a binder for phosphor coatings in fluorescent lamps. Absorption of UV energy that otherwise has the potential to make visible light results in a significant loss in efficiency of fluorescent lamps regardless of their shape and construction. It is desirable, therefore, that a binder material be provided for fluorescent lamps which binds phosphor particles to a surface, but does not require high temperature baking to remove residual material yet still absorbs little or no UV light energy. UV light energy is then applied efficiently to the excitation of phosphor particles to produce visible light and thereby enhance the overall efficiency of the LCD backlight.

SUMMARY OF THE INVENTION

A preferred embodiment of the present invention comprises a selected binder for use in the attachment of phosphor particles in a fluorescent lamp. The selected binder tends to absorb less UV light energy than prior phosphor binding materials. As result, more of the available UV light energy is used in creating visible light, especially as a backlight for an LCD display.

In a most preferred form of the present invention, ethyl silicate serves to form a binder slurry in which phosphor particles are first suspended and then applied to a surface exposed to UV light in the production of visible light. Ethyl silicate is particularly well suited for this purpose because of its unique curing and resultant optical properties. This silicate compound is non-hydrolized, with curing accomplished via introduction of water vapor in the cure process.

Alternate binder materials include a variety of common organo-silicate compounds, notably including methyl silicate and isopropyl silicate.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The preferred embodiment of the present invention comprises a fluorescent lamp having a phosphor coating bound together by a binding material absorbing relatively less UV light energy than other conventional phosphor binders.

Figure 1:
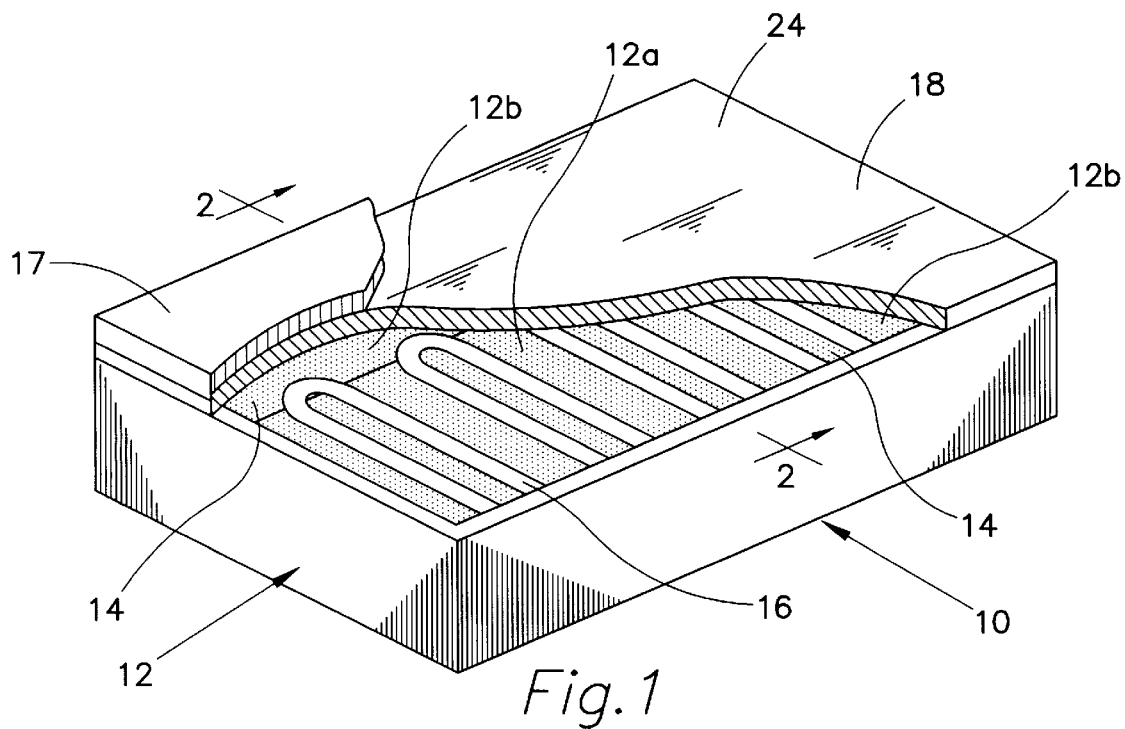
FIG. 1 illustrates in perspective a light box used as a backlight for a flat panel display and including a phosphor binder according to the present invention.
Figure 2:
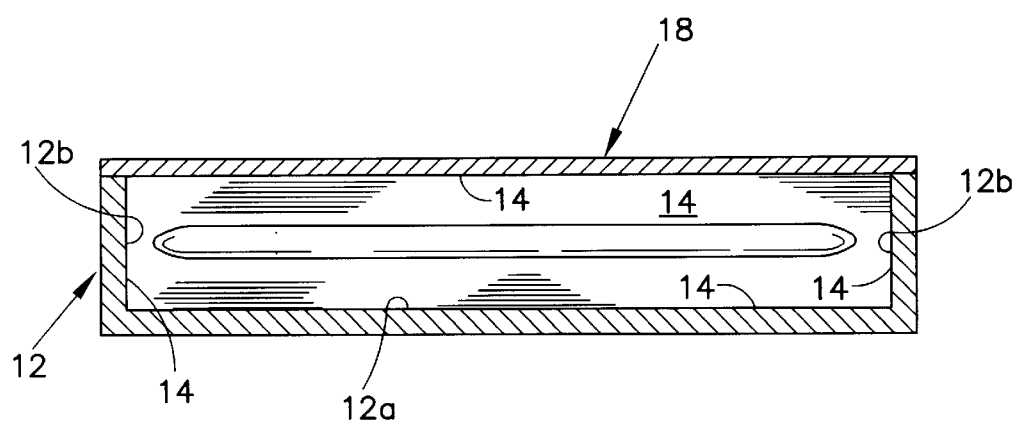
FIG. 2 is a sectional view of the light box of FIG. 1 as taken along lines 2—2 of FIG. 1.

In the drawings, a light box 10 includes an opaque, open top plastic enclosure 12 and a transparent exit window 18. Exit window 18 may be comprised of a variety of transparent materials, e.g., including glass and plastic. Within the enclosure 12 is a serpentine shaped ultra violet (UV) light source 16 producing UV light impinging upon a phosphor coating 14 attached to the interior-facing surface 18a of window 18 and, if desired, to the interior-facing floor surface 12a and interiorfacing wall surfaces 12b. The UV light produced by light source 16, upon striking the coating 14, produces visible diffuse light for application to the exit window 18 and flat panel LCD device 17. As may be appreciated, a flat panel LCD device 17 (shown partially and only in FIG. 1) is positioned against the exterior-facing surface 18b of window 18. Visibility of images presented on the LCD device is improved by the backlight provided by light box 10.

The light box 10 may be constructed from a variety of materials, but in the preferred embodiment would be constructed from lightweight plastic material. Traditional manufacturing techniques for removing phosphor binding material, i.e., baking at 400°–500° centigrade, cannot be employed with respect to light box 10. Because light box 10 would melt at such temperatures, an alternate manufacturing process must be employed to eliminate residual phosphor binding materials, and therefore improve efficiency with respect to UV light applied to the phosphor particles.

In the most preferred form of the present invention, ethyl silicate has been selected for use as a binder in which phosphors are suspended and then applied to the inside of light box 10 used as an LCD backlight. This particular compound was selected for its unique curing and resultant optical properties. Similar alternatives include a variety of common organo-silicate compounds. For example, methyl silicate and isopropyl silicate may be substituted for ethyl silicate.

The chemical reaction of the curing process is set forth below as equation 1:

$$(C_2H_5O)_4Si + 2H_2O \rightarrow 4(C_2H_5OH) + SiO_2$$

where, $(C_2H_5O)_4$ Si is ethyl silicate,
$2H_2O$ is two water molecules,
$4(C_2H_5OH)$ is four molecules of ethyl alcohol, and
$SiO_2$ is silicon oxide.

One molecule of ethyl silicate in the mixture combines with two water molecules from the air to form four molecules of ethyl alcohol (ethanol). The curing process can be accelerated, however, using an oven with elevated humidity conditions. Generally, the oven temperature and humidity levels can vary according to various manufacturing criteria. For example, oven temperature may be in the range of 50°–60° centigrade with a baking time on the order of several hours. Alternatively, an oven temperature of 100°–150° centigrade may be used during an appropriate one hour baking interval. Generally, the process requires a temperature high enough to drive-off moisture from the phosphor and binder slurry. Light box 10 is constructed of formed plastic material, but these temperature and humidity conditions do not degrade light box 10 during the baking process.

The ethanol evaporates completely from the mixture leaving in its place one molecule of pure silicon oxide. The silicon oxide that surrounds the phosphor particles is quartz and is transparent to UV energy generated by the mercury arc stream of the lamp 16 (primarily at wave lengths of 254 and 186 nm). Because it is transparent to UV, it allows a high level of excitation efficiency of the suspended phosphors and is less susceptible to degradation due to its exposure to UV light.

Figure 3:
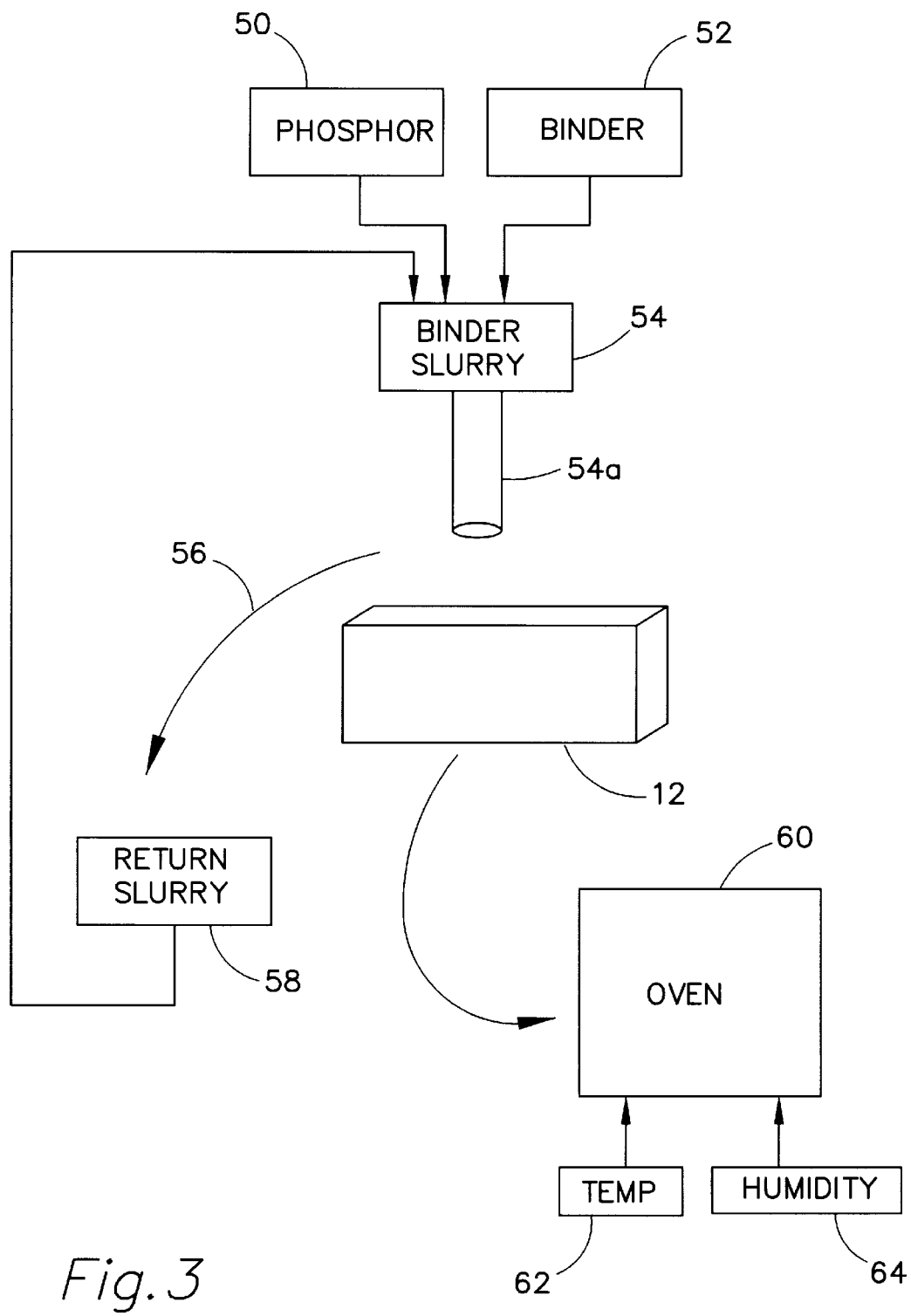
FIG. 3 illustrates a method of manufacturing an LCD light box using the phosphor binder of the present invention.

FIG. 3 illustrates generally the manufacturing steps employed for the light box 10, in particular the application of the phosphor coating 14 to the enclosure 12. As may be appreciated, similar steps are applied in attaching a phosphor coating 14 to the interior-facing surface of exit window 18. In FIG. 3, a phosphor source 50 and a binder source 52 provide corresponding phosphor and binder materials to a binder slurry bin 54. The output 54a of binder slurry bin 54 is applied to each enclosure 12, i.e., poured into the interior of enclosure 12 to coat the interior-facing walls thereof. Excess slurry is then returned by way of path 56 and return slurry bin 58 to the binder slurry bin 54. As a result, the interior-facing surfaces of enclosure 12 carry an uncured phosphor coating 14. Enclosure 12 is then placed in a curing oven 60 including temperature control 62 and humidity control 64. Enclosure 12 remains in oven 60 for sufficient time to drive off any moisture in the phosphor slurry, thereby resulting in a phosphor coating 14 as described herein having residual binder material transparent to UV light.

In the preferred embodiment, the phosphors are suspended in the ethyl silicate and no chemical reaction occurs that would alter the emission characteristics of the phosphors. The cure process does not manufacture or result in any residual materials on the phosphor coating and the atmosphere in the light box is not contaminated. Excitation efficiency of the phosphors is maximized because of the high optical transmission properties of the silicon oxide to the UV energy. In addition, coating the phosphors with ethyl silicate provides moisture resistance further extending the life of phosphors when exposed to humid environments.

Thus, an improved phosphor binder and method of manufacture have been shown and described. In accordance with the present invention, a fluorescent lamp may be produced without requiring relatively high temperature baking to remove residual phosphor binding material. Under the present invention, relatively low temperature baking of organo silicate compounds, e.g., ethyl silicate, methyl silicate, and isopropyl silicate, results in a relatively pure oxide transparent to UV light. Such binding material is of such chemical composition as to decompose appropriately at moderate temperatures to form pure silicated oxide as a residual binder material. The resulting residual material has a high UV light transmittance across a broad frequency spectrum. Furthermore, the residual binder does not generally decompose into a material which absorbs either ultra violet light or visible light. Accordingly, the residual binding material under the present invention has a longer product life for its lack of UV light absorption and the resulting loss in efficiency and product degradation therefrom. LCD backlight products are challenged in efficient use of energy applied, and the subject matter of the present invention minimizes both degradation due to UV light exposure and inefficiency due to UV light absorption.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. A method for producing a fluorescent lamp including a UV light source, the method comprising the steps:

mixing together phosphor particles and a binder material in a slurry, the binder material being an organo-silicate compound;

applying the slurry to a surface of the lamp to be exposed to the UV light source and leaving an uncured coating of the slurry on said surface; and curing the uncured coating to leave a UV light transparent residual binder, and wherein the curing step comprises the step of introducing water, wherein said residual binder is silicon oxide, and said phosphor particles bound thereby to said surface.

2. A method according to claim 1 wherein said organo-silicate compound is one of ethyl silicate, methyl silicate, or isopropyl silicate.

3. A method according to claim 1 wherein said curing step is by a heating step.

4. A method according to claim 3 wherein said heating step comprises a step of heating at less than 300 degrees centigrade.

5. A method according to claim 1 wherein said binder material is one of ethyl silicate, methyl silicate, or isopropyl silicate, and said curing step is by heating.

6. A method according to claim 5 wherein said heating step includes heating under controlled humidity conditions.

7. A method according to claim 1, wherein the step of mixing comprises the step of suspending the phosphor particles in the slurry.

8. A method for producing phosphor binding materials, the method comprising the steps of:

combining a phosphor material and a binder material in a slurry, the binder material being a silicate compound;

applying an uncured coating of the slurry to a surface to be exposed to ultraviolet energy; and curing the uncured coating to result in a residual material that is transmissive to ultraviolet energy, wherein said curing step comprises the step of introducing water and wherein said residual material is silicon oxide.

9. A method according to claim 8, wherein the surface is a surface of a fluorescent lamp.

10. A method according to claim 8, wherein the surface is a surface of an enclosure capable of containing a source of ultraviolet energy.

11. A method according to claim 8, wherein the residual material is transparent to ultraviolet energy.

12. A method for producing phosphor binding materials, the method comprising the steps of:

combining a phosphor material and a binder material in a slurry, the binder material being an organo-silicate compound;

applying an uncured coating of the slurry to a surface to be exposed to ultraviolet energy; and curing the uncured coating to result in a residual material that is transmissive to ultraviolet energy, wherein said curing step comprises the step of introducing water and wherein said residual material is silicon oxide.

13. A method according to claim 12, wherein the surface is a surface of a fluorescent lamp.

14. A method according to claim 12, wherein the surface is a surface of an enclosure capable of containing a source of ultraviolet energy.

15. A method according to claim 12, wherein the residual material is transparent to ultraviolet energy.

* * * * *